United States Patent
Perrot et al.

(10) Patent No.: US 9,488,064 B2
(45) Date of Patent: Nov. 8, 2016

(54) TURBOMACHINE WITH VARIABLE-PITCH VORTEX GENERATOR

(71) Applicant: SNECMA, Paris (FR)

(72) Inventors: Vincent Paul Gabriel Perrot, Maisons Alfort (FR); Agnes Claire Marie Pesteil, Alfortville (FR)

(73) Assignee: SNECMA, Paris (FR)

( * ) Notice: Subject to any disclaimer, the term of this patent is extended or adjusted under 35 U.S.C. 154(b) by 682 days.

(21) Appl. No.: 13/935,827

(22) Filed: Jul. 5, 2013

(65) Prior Publication Data

US 2014/0010638 A1    Jan. 9, 2014

(30) Foreign Application Priority Data

Jul. 6, 2012   (FR) ...................... 12 56504

(51) Int. Cl.
*F01D 17/14* (2006.01)
*F04D 29/68* (2006.01)
*F04D 29/56* (2006.01)

(52) U.S. Cl.
CPC ........... *F01D 17/148* (2013.01); *F04D 29/563* (2013.01); *F04D 29/681* (2013.01)

(58) Field of Classification Search
CPC ........ F01D 7/00; F01D 7/02; F01D 17/148; F01D 17/162; F01D 5/145; F01D 5/146; F04D 29/563; F04D 29/681; F05D 2240/127; F05D 2250/90; F05D 2260/14; F05D 2260/70; F05D 2270/17
USPC ..................... 415/160, 162, 199.5
See application file for complete search history.

(56) References Cited

U.S. PATENT DOCUMENTS 4,652,208 A * 3/1987 Tameo ................ F01D 5/146
                                                  415/148
2013/0064673 A1   3/2013 Domercq et al.

FOREIGN PATENT DOCUMENTS

| DE | 10 2006 048 933 A1 | 4/2008 |
| EP | 1 927 723 A1 | 6/2008 |
| FR | 2 956 454 A1 | 8/2011 |

OTHER PUBLICATIONS

U.S. Appl. No. 13/850,755, filed Mar. 26, 2013, Pesteil, et al.
U.S. Appl. No. 14/125,454, Dec. 11, 2013, Pesteil, et al.
French Preliminary Search Report issued Mar. 26, 2013, in French Application No. 12 56504 filed Jul. 6, 2012 (with Written Opinion and English Translation of Categories of Cited Documents).

* cited by examiner

*Primary Examiner* — Christopher Verdier
*Assistant Examiner* — Brian P Wolcott
(74) *Attorney, Agent, or Firm* — Oblon, McClelland, Maier & Neustadt, L.L.P.

(57) ABSTRACT

A turbomachine including at least one bladed disk and vortex generators positioned upstream of the blading of the disk is provided. The vortex generators are of variable pitch.

14 Claims, 3 Drawing Sheets

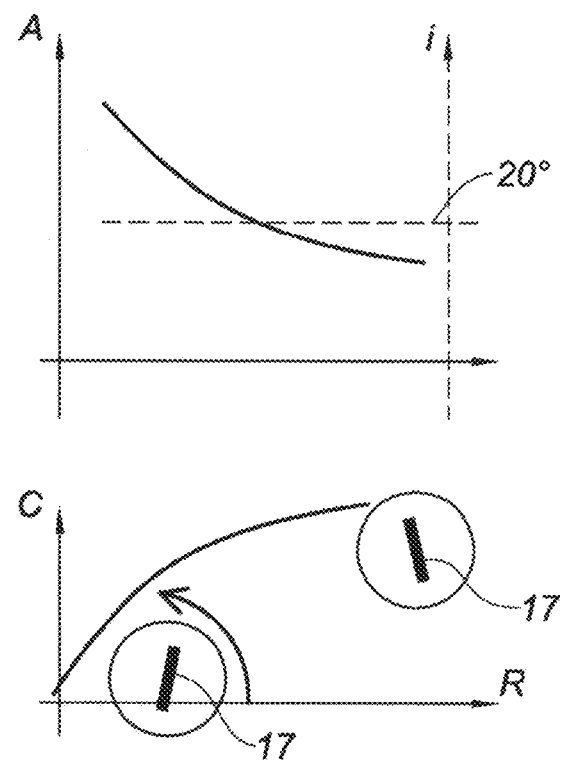
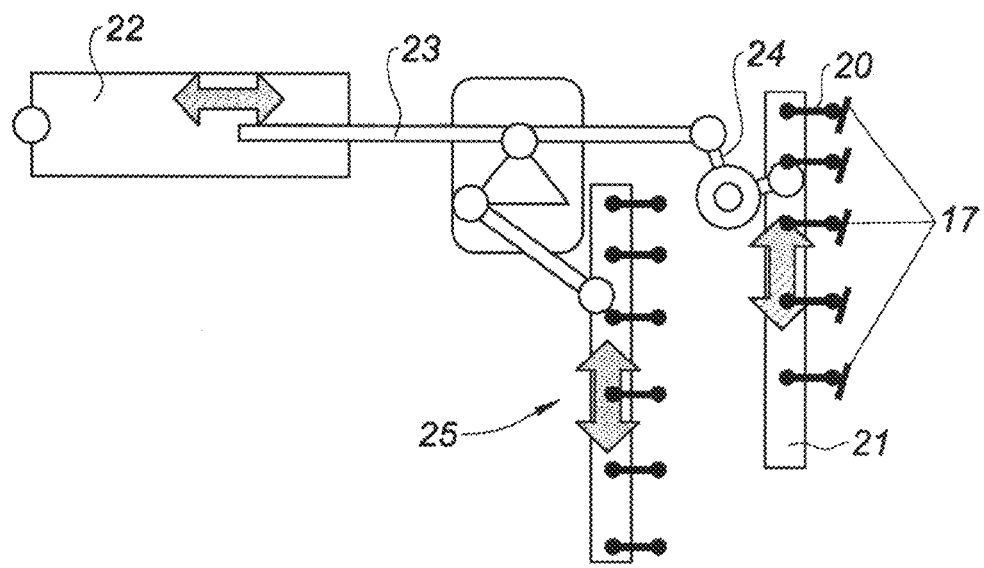
Fig. 6
Fig. 7

TURBOMACHINE WITH VARIABLE-PITCH VORTEX GENERATOR

TECHNICAL FIELD

The field of the present invention is that of turbomachines, notably axial turbomachines, and, more specifically, that of the internal aerodynamics of these turbomachines.

PRIOR ART

A turbomachine is a rotary machine in which energy can be transferred between a fluid and a bladed system secured to a rotor, for example a compressor or a turbine that forms part of a turbine engine such as a gas turbine engine. A gas turbine engine for an aircraft, such as a multi-flow turbojet engine, generally comprises, in the direction in which the gases flow, namely from upstream to downstream, a fan, one or more compressor stages, for example a low-pressure compressor and a high-pressure compressor, a combustion chamber, one or more turbine stages, for example a high-pressure turbine and a low-pressure turbine and a jet pipe for exhausting the gases. Each compressor may have its own corresponding turbine, compressor and turbine being connected by a shaft, and thus for example forming a high-pressure spool and a low-pressure spool. An axial turbojet engine compressor is made up of several successive compression stages, each stage comprising two bladed assemblies, namely a disk that is able to rotate and a fixed disk or stator that acts as a guide vanes assembly. The guide vanes assembly usually comprises blades which are arranged side by side and which extend between an internal shroud and an external shroud which are coaxial, to which shrouds they are connected by their ends.

It is frequently found, in high-pressure axial compressors and, in particular, in highly loaded compressors, that there is a region of three-dimensional separation referred to as a "corner vortex" which is generally situated on the suction-face side of the stator bladings, in the region of the internal shroud, from mid-way along the chord of the blades in the downstream direction. A schematic view of this vortex is given in FIG. 1. The corner effect, which is what causes this vortex, is created by the combined effects of pressure gradients in the axial direction (increase in static pressure through the guide vanes assemblies) and in the tangential direction (flow tending to progress from the high pressures on the pressure-face side toward the low pressures on the suction-face side of the adjacent blades). These two effects cause particles of low kinetic energy to accumulate in the corner formed by the suction-face wall of the blade and the hub. This causes aerodynamic blockage which impairs the efficiency of the compressor. These vortices are also detrimental to the resistance of the compressor to surge phenomena.

It is therefore important to attempt to reduce the size of these corner vortices, if not eliminate them, in order to improve the efficiency of the turbomachines, particularly compressors, and broaden the range in which they are stable.

A number of improvements have therefore been proposed: these relate to the introduction of vortex or swirl generators which are positioned upstream of the fixed or moving disks, such as in patent application FR 2 960 604, for example, which was filed by the applicant company. In that solution, the vortex generators are arranged upstream of the fixed or mobile disks so that they act simultaneously on the main flow and on any recirculating flow. In the case of a compressor guide vanes assembly, the generators are positioned upstream on the internal shroud so that they act simultaneously on the main flow and on the recirculating flow (which corresponds to the flow of fluid passing under the radially internal side of the internal shroud, coming from the downstream face). In the case of a rotor, the generators are provided on the upstream face of the external shroud so that they act simultaneously on the main flow and on the recirculating flow which corresponds to the flow of fluid passing over the radially external side of the external shroud, coming from the downstream face.

The vortex generators are created in the form, for example, of small fins which have the function of creating vortices in the flow path. These vortices allow energy to be transferred from the main flow to the boundary layers, the velocities of which are thereby accelerated. Because it is the low velocities that are responsible for the corner vortex, this vortex effect is reduced.

In another patent application, FR11/0055158, the applicant company recommended using several vortex generators spaced out axially upstream of the bladings and offset circumferentially from one another. According to one embodiment, three vortex generators are used, both the axial and tangential mutual offset of which allows the vortices thus generated to be redirected toward the suction face side of the blade even if each generator is oriented at a low angle of attack, for example 5 to 15°, with respect to the flow of fluid in order to minimize its resistance and has a simple form easy to produce.

The effectiveness of these vortex generators is not optimal. Specifically, all of these solutions relate to vortex generators the position of which is fixed. It therefore follows that their effectiveness is dependent on the characteristics of the flow upstream. In an engine subjected to speed fluctuations, vortex generators are optimized for one operating point, but not for the entire operating range of the engine. It is desirable to seek to improve their effectiveness.

SUMMARY OF THE INVENTION

It is an object of the invention to make improvements to turbomachines and, in particular, to compressors that are heavily loaded so that their corner vortices can be even better controlled and their aerodynamic efficiency is therefore improved.

According to the invention, this result is achieved using a turbomachine comprising at least one bladed disk, be it mobile or static, and vortex generators positioned upstream of the blading of said disk, wherein the vortex generators are of variable pitch.

In this field, the pitch of a blade that forms part of a fixed or rotationally mobile disk is the angle formed between the chord of the airfoil of the blade and the plane of the disk. The pitch is said to be variable when the angle can be adjusted while the turbomachine is in operation.

By virtue of the invention, the operation and effectiveness of the vortex generators are optimized at all speeds, rather than at one operating point.

According to another feature, the vortex generators are produced in the form of fins each arranged along an axis that is radial with respect to the axis of the turbomachine and able to move about said radial axis, the pitch angle of the fins varying by rotation about said radial axis.

According to one embodiment, at least some of the vortex generators are of triangular shape, with an upstream edge inclined with respect to the plane of the disk supporting the blades, secured to a mounting plate that can be rotated in order to adjust said pitch.

The invention notably relates to a bladed disk the blades of which are arranged radially toward the outside about the axis of the turbomachine, the vortex generators being positioned upstream of the blade roots.

More specifically, the invention relates to a turbomachine forming a compressor and the bladed disk of which constitutes a guide vanes assembly therefor, the fixed blades of the disk extending in a circle between an internal shroud and an external shroud which are concentric, and defining interblade passages that form a flow path through which the air that is to be compressed flows, the vortex generators being positioned upstream of said internal shroud.

The solution of the invention is implemented, according to one embodiment, by means of a mechanism for the simultaneous control of the angular pitch of at least some of the vortex generators.

Advantageously, inasmuch as the turbomachine also comprises a mechanism for the angular pitch of at least some of the stator blades, the latter mechanism and the mechanism for controlling the pitch of at least some of the vortex generators are connected to a common operating member.

In an alternative form of the embodiment, the mechanism for the simultaneous control of the pitch of at least some of the vortex generators is operated by rotating at least some of the stator blades.

The invention also applies to a turbomachine comprising a bladed disk that is able to rotate about its axis with an internal shroud and an external shroud which are coaxial, the blades being attached to the shrouds by their ends, a plurality of vortex generators being mounted upstream of the external shroud.

BRIEF DESCRIPTION OF THE FIGURES

The invention will be better understood and further objects, details, features and advantages thereof will become more clearly apparent through the detailed explanatory description which follows of some embodiments of the invention which are given purely by way of illustrative and nonlimiting examples with reference to the attached schematic drawings.

In these drawings:

FIG. 6 gives diagrams depicting the law governing the variation in vortex-generator pitch in order to obtain a constant angle of incidence of the air stream;

FIG. 7 is a diagram indicating the control of the pitch of the vortex generators coupled with the control of the variable-pitch guide-vane-assembly blades of a compressor.

DETAILED DESCRIPTION OF THE INVENTION

Figure 1:
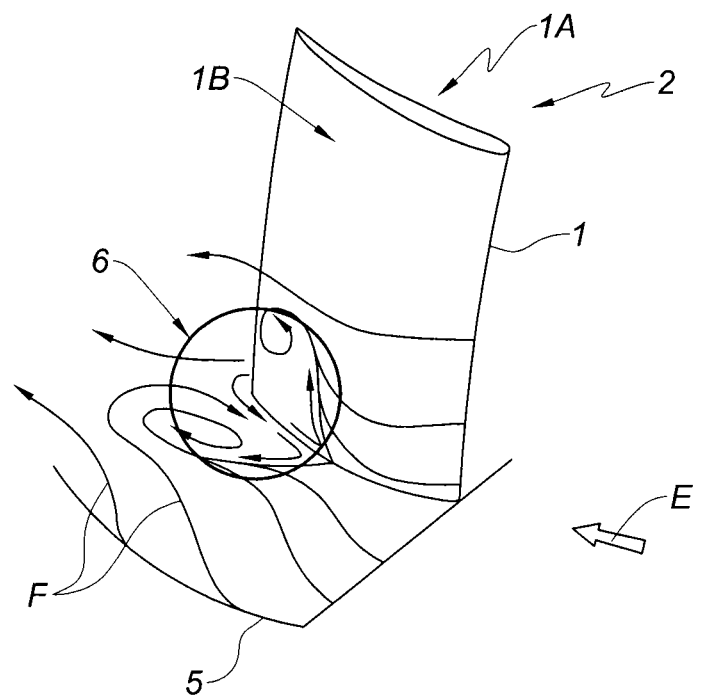
FIG. 1 schematically depicts a blade mounted on the internal shroud of a compressor guide vanes assembly.

Reference is made to FIG. 1 which shows a blade 1 of a guide vanes assembly 2 which forms part of a turbine engine compressor, particularly of an aircraft turbojet engine. A compressor comprises, in the usual way, several successive compression stages, each stage being made up of a rotor and of a guide vanes assembly. The guide vanes assembly 2 comprises a radially external shroud (not depicted in the figure) and a radially internal shroud 5, both serving to support the blades 1. These two shrouds are concentric and a plurality of blades 1 extend substantially radially from one to the other and are secured to both. These blades 1 are spaced around the circumference of the shrouds, preferably uniformly.

In the context of the present invention, upstream and downstream are defined in relation to the direction of the main flow of air through the compressor and the terms axial or radial refer to the axis of this compressor.

FIG. 1 uses an arrow E to indicate the direction of the main flow of air for a cascade of stators operating at low incidence, close to their optimum, and arrows drawn in fine line are used to indicate local circulations of air at the root of the blade 1 and on the pressure-face side 1A or suction-face side 1B of the airfoil thereof. At the root of the blade 1, on its suction-face side 1B, there is a corner separation zone 6. This zone does not begin at the leading edge of the blade but further downstream, on the last part of the pressure-face side or suction-face side thereof.

Figure 2:
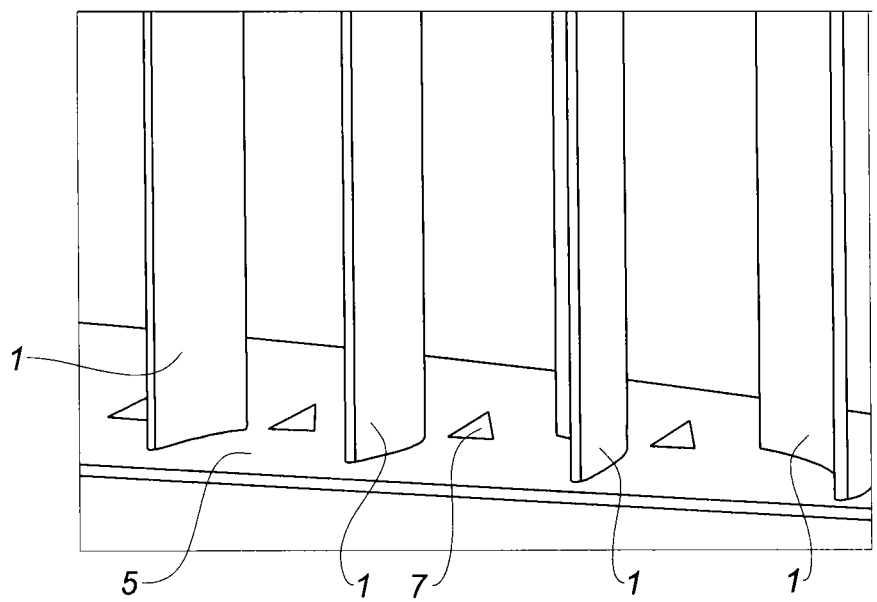
FIG. 2 is a face view of a set of compressor guide vanes assemblies, each fitted with a vortex generator upstream, which is fixed according to the prior art.

Reference is now made to FIG. 2 which shows, viewed from the downstream end, compressor blades fixed to an internal shroud 5 which is chosen to be of planar shape for test bench evaluation of the effectiveness of the vortex generators. Upstream of the root of the blades 1, on the internal shroud 5, are fixed vortex generators 7. According to a typical example, the vortex generator is of triangular shape, extending radially, within the air flow path, from the internal shroud. The triangle is a right-triangle of which the long side L, apart from the hypotenuse, extends along the internal shroud while the short side or height h extends radially from this shroud. The hypotenuse for its part is oriented toward the junction between the internal shroud 5 and the root of the blade 1. The height h is chosen to be between 2 and 15%, preferably between 4 and 8%, of the height of the blade (radial distance between the two, external and internal, shrouds), while the length L is equal to twice the height h of the generator 7, to within ±10%.

Figure 3:
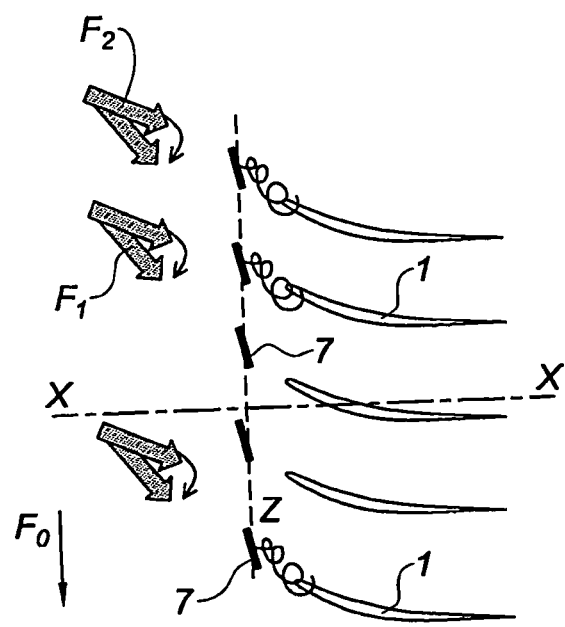
FIG. 3 is a schematic view from above, corresponding to FIG. 2, of the layout of the vortex generators according to the prior art.

FIG. 3 is a view from above with the vortex generators 7 upstream of the fixed blades 1, with respect to the flow of air driven by the blades of the rotor upstream and not depicted, the arrow F0 thereof indicating the direction of travel in a plane that is transverse with respect to the axis of the turbomachine. The arrows F1 and F2 indicate the direction of the incident stream, for two different turbomachine operating speeds. The arrows F1 correspond to a low speed and the arrow F2 corresponds to a higher speed. The difference in inclination with respect to the axis of the machine is due to the increase in the rotational speed of the rotor upstream. In the prior-art solution of FIG. 3, the pitch of the generators is fixed regardless of speed. It then follows that if the vortices Z are optimal for one speed, they are no longer optimal at a different speed, because of the variation in the angle of incidence of the air stream.

Figure 4:
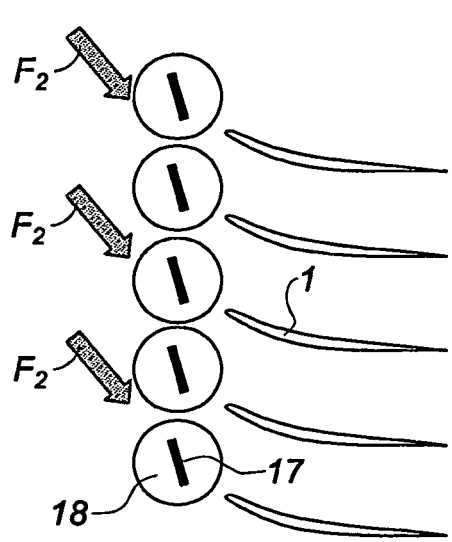
FIGS. 4 and 5 are schematic views illustrating the variation in pitch of the vortex generators according to the invention as a function of the turbomachine operating speed.
Figure 5:
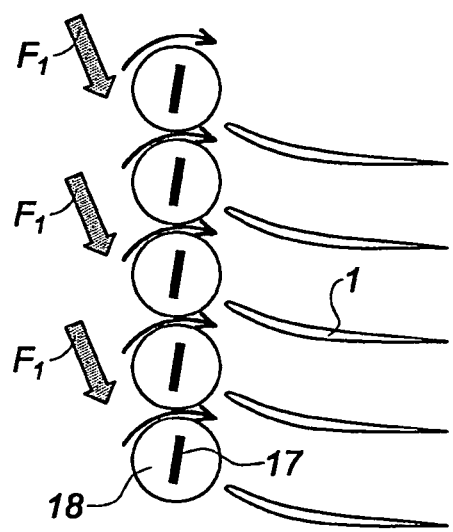

The solution of the invention is to mount the vortex generators on a support capable of rotating so that their pitch can be varied with respect to the axis of the machine as a function of the speed of that machine. FIGS. 4 and 5 show one embodiment according to the invention.

The blades 1 of the guide vanes assembly are unchanged. The vortex generators 17 are themselves each mounted on a mounting plate 18 which is able to rotate about a radial axis perpendicular to the axis of the turbomachine. Thus the pitch of the vortex generators is adjusted by rotation about this radial axis.

FIG. 4 shows the adjustment of the pitch for a first operating speed of the machine and FIG. 5 shows an adjustment for a second operating speed, in this instance a high speed and a low speed respectively.

With reference to the diagrams of FIG. 6, the lower diagram shows the law governing the change in pitch C of the vortex generators as a function of speed R, i.e. the rotational speed of the machine, so that the angle of incidence I of the air stream remains constant with the change in machine speed indicated in the top diagram. By way of example, for a typical range of variation in angle A of the stream of air upstream of between 60 and 40°, the range of variation of the pitch C of the vortex generators is of the order of 15°. It depends on the machine. The optimum angle of incidence I of the generator is of the order of 20°.

Thus, by virtue of the invention, an optimum reduction in corner vortices can be achieved in a compressor by suitable generation of vortices upstream. These vortices allow energy to be transferred from the main flow to the boundary layers: the boundary layers are accelerated. Because it is the low speeds at the root of the stator that are responsible for the corner vortex, this corner vortex effect is reduced.

The solution of the invention has been applied here to the reduction of corner vortices in a compressor guide vanes assembly. The invention more generally makes it possible to optimize the effect of vortex generators in applications other than the one that has just been set out. This device can also be applied to:
  a turbine,
  a compressor with variable-pitch stator, the device being formed upstream of the mobile disks the angle of the incident fluid of which varies with the pitch of the variable-pitch upstream stator or
  a compressor with fixed stator, the device being formed upstream of the mobile disks the angle of incident fluid of which varies as a function of the stream/profile difference which corresponds to the deficiency in the deflection of the air with respect to the deflection imposed by the stator, which likewise varies with speed.

FIG. 7 illustrates one embodiment of how the vortex generators are controlled, this control being coupled to the control of the variable-pitch stator blades of a high-pressure compressor of a gas turbine engine, the vortex generators in this particular instance being mounted on the external shroud. The generators 17 are connected by link rods 20 to a common control ring 21 which is able to rotate about the axis of the engine. Rotating this ring in one direction or the other by transmission of movement causes a variation in the pitch of all of the vortex generators 17. The rotation of the ring 21 is controlled by an actuator 22 the rod 23 of which is connected to a bell-crank 24 for actuation of the ring 21.

Advantageously, this same rod 23 actuates the control ring 25 that controls the pitch of the variable-pitch stator blades, the mechanism for actuating these being known. The actuator is connected to a source of pressurized fluid the supply of which is regulated as a function of engine speed and the transmission of the movement of the actuator rod is determined by the law that governs the variation in stator blade pitch on the one hand and vortex generator pitch on the other.

In an alternative form of embodiment that has not been depicted, still on the side of the external shroud, the combined control of the pitch of the vortex generators and of the blades is achieved with one single control ring that combines the control rings 21 and 25 depicted in FIG. 7. In this case, the single control ring supports two sets of link rods which are set up so that, as a function of its movement, one set obeys the law governing the variation in blade pitch and the other obeys the law governing the variation in vortex generator pitch. This alternative form reduces the number of actuators and makes it possible to reduce the weight of the system while at the same time guaranteeing that the pivoting of the vortex generators will be synchronized with that of the stator blades.

According to another alternative form that has likewise not been depicted, the vortex generators are positioned on the internal shroud and are kinematically linked to the roots of the blades on this shroud. According to one embodiment of this alternative form, a control ring is driven by a first set of link rods connected to the roots of the blades and in turn actuates a second set of link rods connected to the vortex generators. Such a mechanism makes it possible to make use of the movement of the stator blades, which are driven for example by the previously-described mechanism on the external shroud, to actuate the vortex generators situated on the internal shroud following the correct pitch-variation law.

The invention, notably by using a control device that performs the functions described hereinabove, can with particular advantage be implemented in the upstream stages of the high-pressure compressor. This is because it is the most upstream stages of the turbomachine that advantageously comprise the variable-pitch stators.

The invention claimed is:

1. A turbomachine comprising:
  a bladed disk including a blade, the bladed disk being mobile or static; and
  a vortex generator positioned upstream of the blade of said bladed disk,
  wherein the vortex generator is of variable pitch between a first position and a second position, and
  wherein a height of the vortex generator is 2% to 15% of a height of the blade.

2. The turbomachine as claimed in claim 1, wherein the vortex generator includes a fin arranged along an axis that is radial with respect to an axis of the turbomachine and able to move about the radial axis, the pitch angle of the fins varying by rotation about the radial axis.

3. The turbomachine as claimed in claim 2, wherein the vortex generators are the vortex generator is of triangular shape, with an upstream edge inclined with respect to the radial axis, and is secured to a mounting plate which is rotatable about the radial axis.

4. The turbomachine as claimed in claim 1, wherein the blade of the bladed disk is arranged radially about the axis of the turbomachine, and the vortex generator is positioned upstream of a root of the blade.

5. The turbomachine as claimed in claim 1, wherein the bladed disk constitutes a guide vane assembly of a compressor, the blade extending between an internal shroud and an external shroud which are concentric, and defining inter-blade passages that forma flow path through which air that is to be compressed flows, the vortex generator being positioned upstream of said internal shroud.

6. The turbomachine as claimed in claim 1, wherein the bladed disk is able to rotate with an internal shroud and an external shroud which are coaxial, the blade being attached to the shrouds by ends thereof, and the vortex generator is mounted upstream of the external shroud.

7. The turbomachine according to claim 1, comprising a control mechanism for control of the variable pitch of the vortex generator.

8. The turbomachine as claimed in claim 7, wherein said control mechanism comprises a control ring.

9. The turbomachine as claimed in claim 8, comprising a stator blade pitch control mechanism for controlling a pitch of a stator blade, the stator blade pitch control mechanism and the control mechanism for controlling the pitch of the vortex generator being connected to a common operating member.

10. The turbomachine as claimed in claim 8, wherein the mechanism for control of the variable pitch of the vortex generator is operated by rotation of a stator blade.

11. The turbomachine as claimed in claim 1, wherein the vortex generator is positioned upstream of a leading edge of the blade of said bladed disk.

12. A turbomachine comprising:
   a bladed disk including a blade, the bladed disk being mobile or static; and
   a vortex generator positioned upstream the blade of said bladed disk,
   wherein the vortex generator is of variable pitch between a first position and a second position,
   wherein the vortex generator includes a fin arranged along an axis that is radial with respect to an axis of the turbomachine and able to move about the radial axis, a pitch angle of the fin varying by rotation about the radial axis, and
   wherein the vortex generator is of triangular shape, with an upstream edge inclined with respect to the radial axis, and is secured to a mounting plate which is rotatable about the radial axis.

13. The turbomachine as claimed in claim 12, wherein the vortex generator is positioned upstream of a leading edge of the blade of said bladed disk.

14. The turbomachine as claimed in claim 12, wherein a height of the vortex generator is 2% to 15% of a height of the blade.

* * * * *